March 19, 1957 E. KOCH 2,785,514
CARRIAGE MOVING STRUCTURE FOR MACHINE TOOLS
Filed Dec. 6, 1954 3 Sheets-Sheet 1
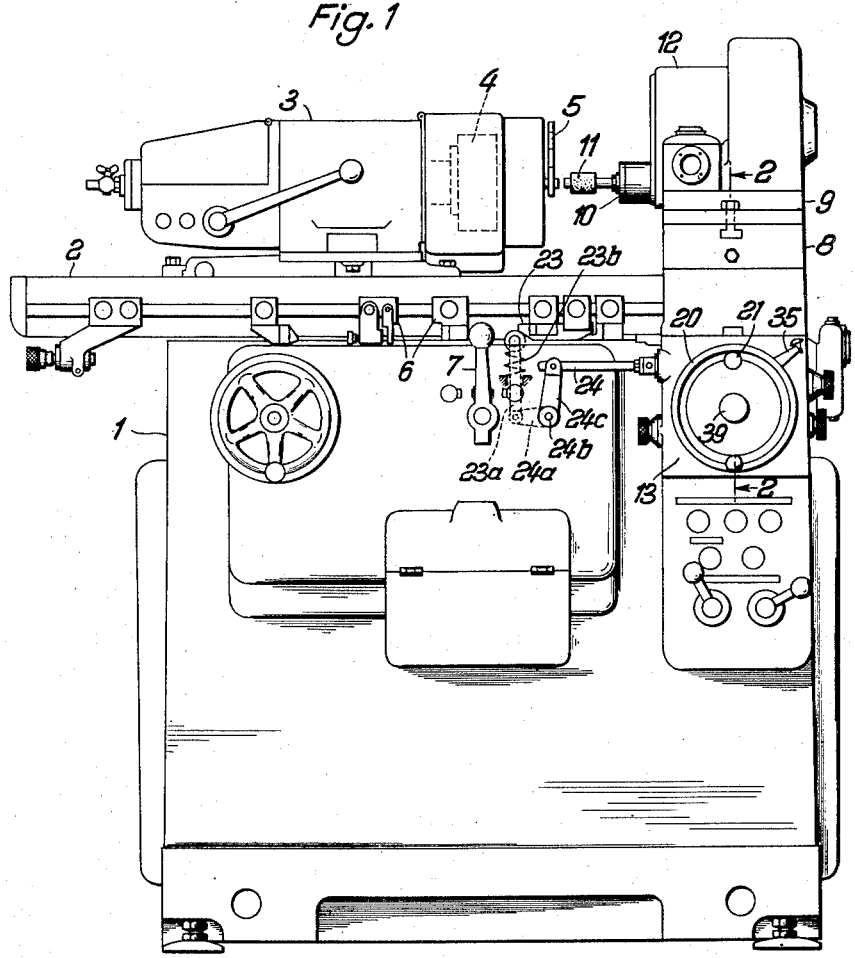
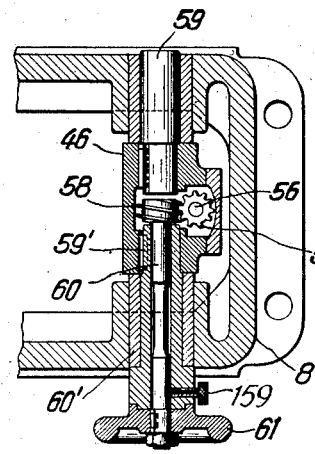
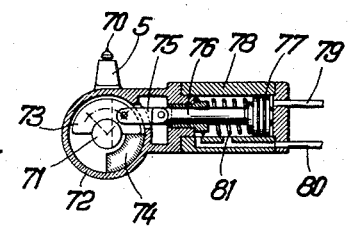
Inventor:
Erich Koch
by:
Michael S. Striker
agt.

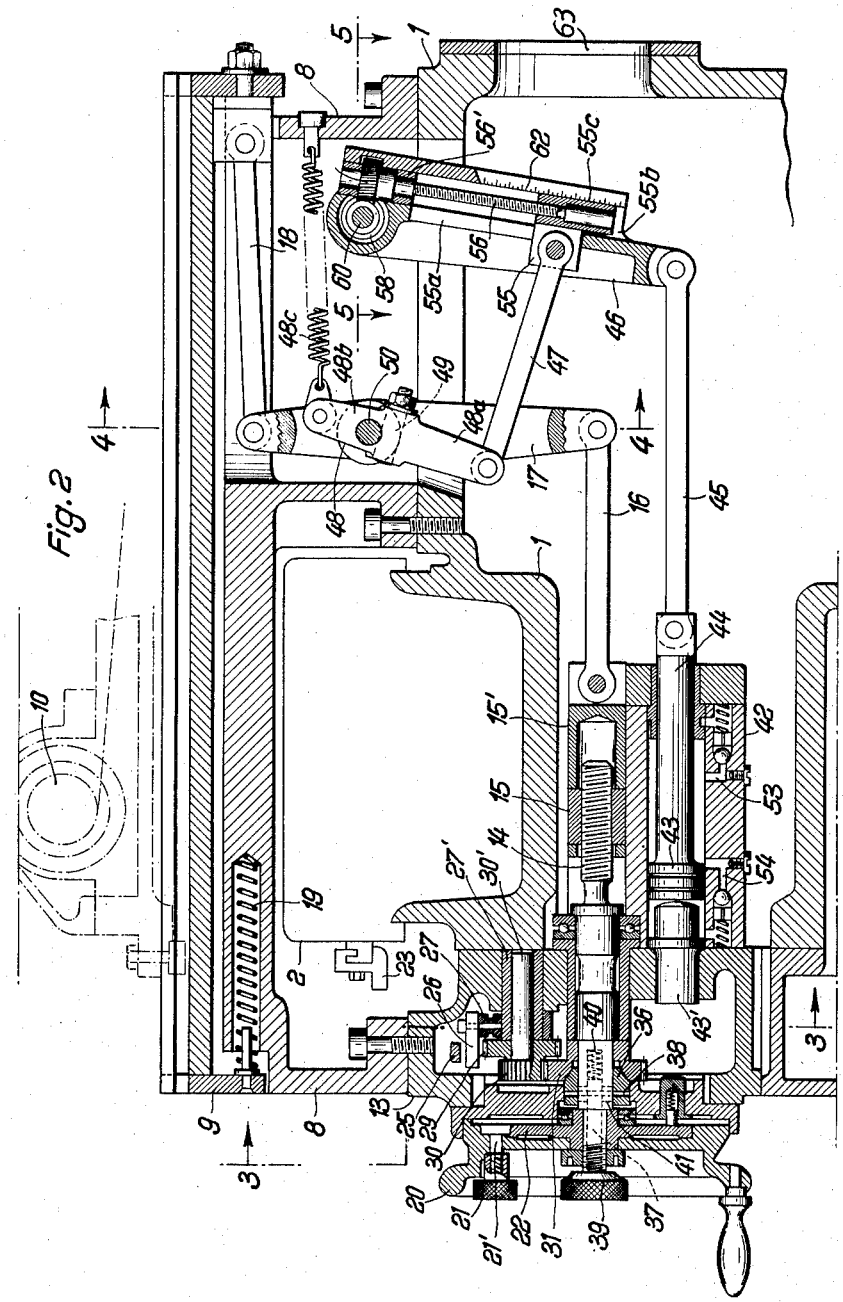

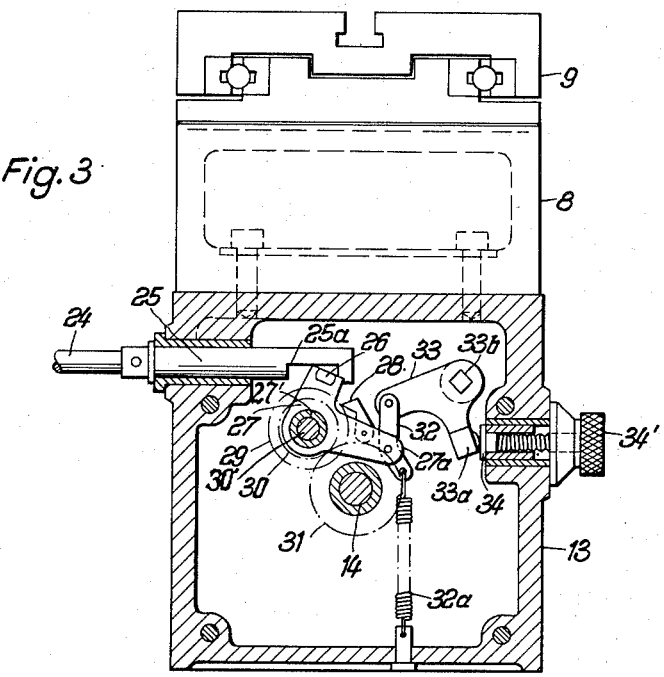

United States Patent Office 2,785,514
Patented Mar. 19, 1957

2,785,514

CARRIAGE MOVING STRUCTURE FOR MACHINE TOOLS

Erich Koch, Berlin-Charlottenburg, Germany, assignor to Firma Jung Schleifmaschinen H. Gaub, Berlin-Tempelhof, Germany Application December 6, 1954, Serial No. 473,339

Claims priority, application Germany December 10, 1953

8 Claims. (Cl. 51—165)

The present invention relates to machine tools and more particularly to structure for moving a carriage of a machine tool so as to adjust the position of the carriage.

In modern machine tools it is often desirable to be able to manually adjust the position of a tool carrying carriage, for example, when setting a machine tool up for automatic operation, and after the machine is thus set up and a few test pieces have been manually machined, an automatic moving means for automatically shifting the carriage to the desired positions is connected to the carriage to move the same in a predetermined cycle of movements.

Up to the present time structures for accomplishing this result have been exceedingly complicated and have not produced the desired results in the best possible manner. Thus, the manual movement of the carriage may be provided through a mechanical structure while the automatic movement may be provided hydraulically, and the problem of connecting both the mechanical and the hydraulic structures to the carriage has not yet been solved satisfactorily. For example, it is known to divide a single carriage up into two parts which are respectively connected to the mechanical and hydraulic structures, but this arrangement leaves much to be desired.

One of the objects of the present invention is to overcome the above drawbacks by providing a machine tool with a mechanical moving means and a hydraulic moving means both of which are connected to the same carriage.

Another object of the present invention is to provide an arrangement according to which the means for moving the carriage is capable of effecting coarse as well as fine adjustments.

Furthermore, it is an object of the present invention to connect a pair of independent moving means to a single carriage in such a way that either of the moving means may be operated without disturbing the operation of the other moving means.

Also, it is an object of the present invention to provide a means for automatically moving a carriage through a pre-selected distance whenever a second carriage or a given machine tool reaches a predetermined position, and this automatic movement of the carriage is arranged so as not to interfere with other structures for moving the carriage.

An additional object of the present invention is to provide a manually operable means for moving a carriage through extremely small distances so that the finest adjustment can be effected manually.

With the above objects in view the present invention mainly consists of a machine tool which includes a carriage and a support means supporting the carriage for movement along a predetermined path. A pivot pin has a first portion mounted for turning movement about its axis on the support means and a second portion rigid with the first portion and having an axis parallel to and spaced from the axis of the first portion. A lever is turnably mounted intermediate its ends on the second portion of this pivot pin for free turning movement thereon and is operatively connected to the carriage for transmitting movement thereto. A first moving means is operatively connected to the lever for turning the same about the second portion of the pivot pin. A second lever is fixed to the second portion of the pivot pin, and a second moving means is operatively connected to said second lever for turning the same and said pin therewith about the axis of said first portion of said pin.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a front elevational, partly diagrammatic view of a machine tool constructed in accordance with the present invention;

Fig. 2 is a sectional view on an enlarged scale of a part of the structure of Fig. 1 and is taken along line 2—2 of Fig. 1 in the direction of the arrows;

Fig. 3 is a sectional elevational view of the structure of Fig. 2 taken along the line 3—3 of Fig. 2 in the direction of the arrows;

Fig. 4 is a sectional view of the structure of Fig. 2 taken along the line 4—4 of Fig. 2 in the direction of the arrows;

Fig. 5 is a sectional view of part of the structure of Fig. 2 taken along the line 5—5 of Fig. 2 in the direction of the arrows; and Fig. 6 is a partly diagrammatic, sectional elevational view of a structure for moving a diamond to and from an operating position.

Referring now to the drawings, and in particular to Fig. 1, it will be seen that the machine of the invention includes a frame 1 which carries a carriage 2 for movement to the right and left as viewed in Fig. 1 along the frame 1. The carriage 2 carries a structure within the housing 3 for rotating a chuck 4 which carries the work. In the particular example illustrated the machine is a grinding machine for grinding the inner surface in a bore of a workpiece. At the front of the housing 3 is located a diamond carrying structure the details of which are shown in Fig. 6, and in the idle position shown in Fig. 6 the diamond carrying structure, used for trueing the grinding wheel, is out of the way of the workpiece and the grinding wheel. The manner in which the diamond enters into the operations is described below.

An unillustrated known hydraulic moving means is connected to the carriage 2 for moving the same along suitable guides on the frame 1. Blocks 6, adjustably fixed to the front side face of the carriage 2, engage a lever 7 in a known way to actuate a valve for reversing the movement of the carriage so that when the carriage 2 comes to the end of its movement to the right, as viewed in Fig. 1, it automatically is reversed and then moves to the left. This lever 7 may be turnable in two perpendicular planes so as to be capable of actuating a plurality of different controls in a known way not forming part of the present invention and not necessary for an understanding of the invention.

In front of the chuck 4 on the frame 1 is located a guide 8 which guides and supports a carriage 9 for movement transversely of the frame 1 and carriage 2 in a direction normal to the plane of Fig. 1. This carriage 9 carries the rotatable spindle 10 to which the grinding wheel 11 is fixed, and the carriage 9 also carries a driving motor 12 which is operatively connected to the spindle 10 through any suitable known means such as an endless belt for driving the spindle 10. In order to adjust the carriage 9 a pair of moving means, one mechanical and one hydraulic, are operatively connected to the carriage 9 in accordance with the present invention, this carriage 9 being made in one piece, and the pair of moving means being capable of giving the carriage 9 any desired adjustment as will appear from the description which follows.

Fig. 2 shows the mechanical moving means for shifting the carriage 9 transversely of the frame 1, and this mechanical moving means can be operated manually and automatically. A part of the frame 1 is formed by a support 13 in which a screw member 14 is turnably mounted in a suitable bearing, as shown in Fig. 2. The screw member 14 is threaded only at its right hand end portion, as viewed in Fig. 2. This threaded portion of the screw member 14 cooperates with a nut 15 which is restrained against turning movement as by locating the flat bottom side face of the nut 15 in sliding engagement with the flat top face of the cylinder 42 shown in Fig. 2 directly beneath the nut 15, this cylinder 42 being fixed to the rear face of the support 13. Thus, upon turning of the screw 14 the nut 15 can only shift along the axis of the screw 14. A tubular extension 15' is fixed to and extends from the nut 15, this tubular extension 15' having in its interior sufficient clearance for the screw member 14 to allow elements 15 and 15' to move together through the desired distance. At its right free end, as viewed in Fig. 2, the extension 15' is pivotally connected to the left end, as viewed in Fig. 2, of a link 16 whose right end is pivotally connected to the bottom end of a lever 17, shown also in Fig. 4. The lever 17, as is apparent from Fig. 4, is composed of a pair of rigidly interconnected side arms, and this lever 17 is turnably mounted intermediate its ends on the intermediate portion 50 of a pivot pin whose ends 50a and 50b are respectively turnable in bearings 51 carried by the support 8 for the carriage 9, as shown in Fig. 4. The pivot pin is located nearer to the top end of lever 17 than to the bottom end thereof, and this top end of lever 17 is pivotally connected to one end of a link 18 whose opposite end is pivotally connected directly to the carriage 9, as shown in Fig. 2. A spring 19 extends into a bore of the guide 8, as shown in Fig. 2, and engages the carriage 9 to urge the latter to the left, as viewed in Fig. 2, so that the spring 19 takes up any play in the linkage 16—18. In the particular example illustrated the length of the arm of lever 17 extending below the pivot pin is twice as long as the length of the arm thereof extending above the pivot pin so that the carriage 9 is shifted with the linkage 16—18 through one-half the distance through which the nut 15 is moved upon turning of the screw 14. It is evident, however, that any desired ratio between the arms of lever 17 may be provided.

The screw member 14 extends completely through the support 13 and a hand wheel 20 is freely turnable on the hub of a disc 22 which is fixed to the member 14 as by being keyed thereto. The hand wheel 20 may have any suitable graduations thereon to cooperate with a stationary index on a stationary part of the support 13, and a pin 21' extends through the hand wheel 20 and has its head end in engagement with the rear face of hand wheel 20 and the periphery of the disc 22. A nut 21 engages the left threaded end of the pin 21' so that this nut 21 may be turned to clamp hand wheel 20 to the disc 22, and when elements 20 and 22 are thus clamped together rotation of hand wheel 20 will produce turning of the screw member 14. The nut 21 may be manually loosened whenever desired in order to adjust the hand wheel 20 angularly with respect to the axis of the screw member 14. In the illustrated example the screw member 14 is provided with threads having a pitch of 2 mm. so that when the screw member 14 is turned through one revolution the nut 15 moves along the axis of screw member 14 through a distance of 2 mm. Because of the transmission ratio provided by the lever 17, the carriage 9 will be shifted through one millimeter when the hand wheel 20 and screw 14 are turned through one revolution. The hand wheel 20 is provided with 200 graduations uniformly spaced therabout so that when the hand wheel 20 is turned through an angular distance corresponding to the space between two consecutive graduations the carriage 9 will be shifted through 0.005 mm.

A means is provided for automatically actuating the above described mechanical moving means so as to automatically shift the carriage 9 when the carriage 2 reaches a predetermined position on the frame 1, and this automatic means includes a block 23 carried by the carriage 2 at its front side face and capable of being adjusted therealong. As is apparent from Fig. 2, the support 8 for the carriage 9 is provided with a passage extending therethrough having sufficient clearance for the carriage 2 and the control members 6 and 23 carried thereby. As is apparent from Fig. 1, as the carriage 2 moves to the left beyond the position shown in Fig. 1, the left bevelled end face of the block 23 engages the top free end of a bar 23a which is guided on the frame 1 for vertical movement and which is urged upwardly by the diagrammatically illustrated spring 23b. The bottom end of the bar 23a is pivotally connected to an arm 24a which is fixed to a shaft 24b turnably carried by the frame 1 and extending to the exterior thereof. At the exterior of the frame 1 the shaft 24b is fixed to an arm 24c which is pivotally connected at its top end to a bar 24 whose right end, as viewed in Figs. 1 and 3, is fixed to an extension 25 guided slidably for movement into and out of the support 13. The right free end of the extension 25, as viewed in Fig. 3, is formed with a cutout 25a into which a pin 26 extends, this pin 26 being fixed to a bell crank 27 freely turnable about a sleeve 27' carried by the support 13. The bell crank 27 pivotally carries a pawl 28 which cooperates with a ratchet wheel 29 which is fixed to a gear 30 which is in turn fixed to a shaft 30' turnable in the sleeve 27'. Any spring or the like, not shown, may engage the pawl 28 to urge the same toward the teeth of ratchet wheel 29. The gear 30 meshes with a gear 31 which is freely turnable on an unthreaded portion of member 14.

Arm 27a of bell crank 27 is pivotally connected to a link 32 which is in turn pivotally connected to a second bell crank 33 having a square opening into which a square portion of a shaft 33b extends so that bell crank 33 and shaft 33b necessarily turn together. The free end 33a of bell crank 33 engages a stop 34 which may be adjusted by turning the screw member 34' which extends to the exterior of the machine and which is in threaded engagement with the stop 34. A spring 32a is connected to the support 13 and to the link 32 to urge the parts to the position shown in Fig. 3. As is apparent from Figs. 1 and 3 when the block 23 depresses the bar 23a during movement of carriage 2 to the left beyond the position shown in Fig. 1, the extension 25 will be shifted to the left, as viewed in Fig. 3, and the right end of cutout 25a will engage the pin 26 to turn bell crank 27 in a counterclockwise direction, as viewed in Fig. 3, so that the pawl 28 will engage ratchet wheel 29 and turn the latter together with gear 30 about the axis of shaft 30'. The spring 32a returns the parts to the position shown in Fig. 3, and the engagement of bell crank 33 on the stop 34 controls the idle position of pin 26 so that in this way the angle through which ratchet wheel 29 and gear 30 are turned may be controlled by the screw 34'. Axial movement of screw 34' is prevented in any suitable way, such as by preventing axial shifting of a collar fixed to the screw 34'. The shaft 33b extends to the exterior of the machine at the front thereof, and the lever 35 shown in Fig. 1 is fixed to the shaft 33b so that the operator may depress the lever 35 to manually turn the mechanism shown in Fig. 3 so that in this way the ratchet wheel 29 and gear 30 may be manually turned. The movement from the gear 31, which meshes with the gear 30, to the member 14 is transmitted through a releasable clutch mechanism in the form of a cone clutch member 36 freely shiftable along member 14 and having a conical face in engagement with a conical face of the gear 31. The member 14 is formed at its left free end portion which extends through disc 22 with an axial bore in which a spring 40 is located, and a pin 37 is slidable within this bore. A screw member 39 extends threadedly into the bore and engages the pin 37 to shift the latter to the right, as viewed in Fig. 2, to compress the spring 40, and when the screw 39 is backed off the spring 40 will shift the pin 37 to the left, as viewed in Fig. 2. The member 14 is formed with a pair of opposed slots 41 communicating with the axial bore in which pin 37 is located, and a pin 38 extends through the pin 37 and through the slots 41 and is fixed to the clutch member 36. Thus, by turning the screw 39 the frictional engagement between members 31 and 36 may be regulated, and the movement of gear 31 is transmitted through clutch member 36 and pin 38 to the screw member 14. Thus, it is evident that the block 23 may be positioned to cause automatic turning of screw 14 and shifting of carriage 9 at a desired moment during the movement of carriage 2 along the frame 1, and furthermore, at any desired time the lever 35 may be depressed to also shift the carriage 9.

It is apparent from the above that coarse adjustments of the carriage 9 may be effected by turning the hand wheel 20 while fine adjustments thereof may be effected with the lever 35, and moreover, the carriage 9 will be automatically adjusted each time the block 23 engages the bar 23a. The fine adjustment obtained with this structure is on the order of several thousandths of a millimeter, approximately 0.005 mm., and this particular fine adjustment may be too coarse for certain purposes. An even finer adjustment is provided by additional structure of the invention described below in connetcion with the hydraulic moving means for the carriage 9.

The hydraulic moving means includes the cylinder 42 in which a piston 43 is movable. The piston rod 44 of piston 43 extends slidably through the right end wall of cylinder 42, as viewed in Fig. 2, a suitable seal being provided at the place where rod 44 extends through the wall of cylinder 42. The right free end of piston rod 44 is pivotally connected to the left end of link 45, as viewed in Fig. 2, and the opposite end of link 45 is pivotally connected to a lever 46 whose top end is pivotally carried by the support 8 in the manner shown most clearly in Fig. 5. Thus, as is evident from Fig. 5, a pivot pin 59 carried by the support 8 is keyed to and turnably carries the lever 46, and at its side distant from pin 59 an end portion of a sleeve 59' is keyed to and turnably supports the lever 46. This lever 46 is connected in a manner described below through a link 47 to the arm 48a of a lever 48 formed with an opening through which the intermediate portion 50 of the pivot pin passes. Thus, the lever 48 has an arm 48b above the pivot pin and arm 48a below the pivot pin. A spring 48c is connected to the support 8 and to the top end of arm 48b to eliminate play in the joints of the linkage. As is apparent from Fig. 4 the lever 48 is located between the side portions of lever 17 and a pin 49 extends into a part of the opening of lever 48 through which the pivot pin passes. The portion 50 of the pivot pin is provided with a flat face engaging the pin 49 so that in this way lever 48 and the pivot pin are constrained to turn together. The intermediate portion 50 of the pivot pin has an axis parallel to and spaced from the axis of the end portions 50a and 50b of the pivot pin so that this intermediate portion 50 forms an eccentric.

The link 47 is pivotally connected at its right end, as viewed in Fig. 2, to a block 55 which is slidable in suitable guides formed in the lever 46. For example, the lever 46 is formed with a slot 55a through which a part of block 55 extends, and the lever 46 is formed with a groove 55b in which part 55c of block 55 is located. Thus, the block 55 is slidable along the length of the lever 46. The part 55c of block 55 is formed with a threaded bore into which a screw 56 threadedly extends, and this screw 56 is turnably carried by a bearing 56' fixed to the lever 46. A worm wheel 57 is fixed to the screw 56 and meshes with a worm 58 of the same pitch and diameter as the worm wheel 57 so that one revolution of worm 58 produces one revolution of worm wheel 57 and screw 56. The worm 58 is fixed to a shaft 60 turnable in the sleeve 59' and extending to the exterior of the machine where a hand wheel 61 is fixed to the shaft 60. Actually the hand wheel 61 is keyed to the shaft 60 so that these parts turn together. A set screw 159 provided in the exterior portion of sleeve 59' is adapted to clamp the shaft 60 within sleeve 59 in its respective adjusted position. A sleeve 60' is carried by the support 8 and turnably supports sleeve 59' keyed on its inner end to lever 46 and extending through the sleeve 60' to the exterior of the machine. Thus, when the hand wheel 61 is turned after release of set screw 159, the shaft 60 with the worm 58 is turned correspondingly. The turning movement of the worm 58 produces through the worm wheel 57, a turning movement of screw 56 so that the block 55, threadedly engaged by the screw 56, moves along the lever 46 and thereby moves the link 47 so that the working length of lever 46 may be adjusted in a stepless manner. The lever 46 is provided with a scale 62 cooperating with the block 55 and visible through a window 63 of frame 1 so that the operator may see the position to which the block 55 is moved. The piston 43 is moved through a stroke of predetermined length, and the scale 62 indicates directly the extent to which the carriage 9 will be shifted during a stroke of the piston 43 in accordance with the position of block 55 along the lever 46. This shifting takes place in the following manner:

The piston 43 moves from the rest position shown in Fig. 2 to the right through a predetermined distance and then back again. As the piston 43 moves to the right, the lever 46 is turned in a counterclockwise direction, as viewed in Fig. 2, and the link 47 thus turns the lever 48 and the pivot pin in a counterclockwise direction. During this time the link 16 restrains the bottom end of lever 17 against translational movement, so that the turning of the eccentric portion 50 of the pivot pin shifts the lever 17 about its bottom end and in this way an extremely small movement of the carriage 9 is provided.

The cylinder 42 communicates with fluid conduits at the bores 53 and 54 of the cylinder 42, respectively, and the arrangement of the hydraulic system which cooperates with the cylinder 42 may take any suitable known form not forming part of the present invention. The hydraulic system is controlled by the movement of the carriage 2 on the frame 1, and any suitable hydraulic fluid such as oil is supplied alternately through the bores 53 and 54 to effect reciprocation of piston 43 through a stroke of predetermined length, this piston 43 returning to its idle position shown in Fig. 2 where it is located against the stop 43'. It will be noted that the turning of lever 48 together with the pivot pin through the above described hydraulic moving means may take place separately from the movement of the mechanical moving means or simultaneously therewith and there is nothing to prevent either simultaneous or separate operation of the hydraulic and mechanical moving means described above.

It is preferred to supply the cylinder 42 with oil in such a way that when the carriage 9 moves the grinding wheel toward the workpiece a fast movement takes place as a result of supply of oil at a relatively fast rate, while once the grinding wheel engages the workpiece a slow movement of the carriage 9 takes place as a result of a reduced rate of a supply of oil. The return of the piston 43 to its rest position against the stop 43' may take place quickly. A suitable hydraulic control apparatus for performing the aforementioned cycle of operations is disclosed in my copending application Serial No. 488,272.

An arm 5 is provided to support a diamond for trueing the grinding wheel, and this arm 5 is diagrammatically shown in Fig. 1. Fig. 6 shows partly diagrammatically how the arm 5, which carries the diamond 70, is fixed to a shaft 71 turnably supported by the housing 72. The arm 5 extends through a suitable slot in the housing 72, and an arcuate member 73 which extends through 180° is fixed to the shaft 71 beside the arm 5. An arcuate stop 74 which extends through 90° is fixed inside the housing 72, and as is apparent from Fig. 6, when the arm 5 extends upwardly in its idle position the right face of the arcuate member 73 engages the top face of the stop 74. A link 75 is pivotally connected to the arcuate member 73 and to a piston rod 76 which is fixed to a piston 77 slidable in the cylinder 78 which is provided with oil under pressure through the conduit 79, oil flowing from cylinder 78 through the conduit 80. A spring 81 urges the piston 77 and the arm 5 to its idle position shown in Fig. 6. The hydraulic system provides oil under pressure to the cylinder 78 at a desired moment, and this produces leftward movement of piston 77, as viewed in Fig. 6, to produce a counterclockwise turning of the arm 5 and diamond 70. This movement continues until the left face of arcuate member 73, as viewed in Fig. 6, engages the lower left face of the arcuate stop 74, and in this position the arm 5 extends horizontally and the diamond 70 is in a position to engage the grinding wheel for trueing the same.

The above-described structure operates as follows:

The disclosed machine is suitable for grinding of bores and it should be noted, that the reciprocation of carriage 2 during the proper grinding operation, i. e. rough grinding and finish grinding, preferably provides for the grinding of bores longer than the grinding wheel 11, so that the grinding action is distributed along the bore. The above-described mechanical moving means may be used to set the machine up, and to determine what movements are required for the grinding wheel in order to carry out the desired machining. The movements produced with the automatic hydraulic moving means are very small and in fact the grinding wheel may be used to machine a bore which is not much larger in diameter than the diameter of the grinding wheel itself. The diamond 70 when it is in its operating position determines the finished size of the bore. In adjusting the machine the operator will turn the hand wheel 61 so as to give the carriage 9 a movement of desired length. Each cycle of operations includes three main steps, the first step being rough grinding, the second step being trueing of the grinding wheel, and the third step being finish grinding. The parts are shown in Fig. 1 in the rest position. In this position the operator removes a finished workpiece from the chuck 4 and conects the next workpiece to be machined to the chuck 4. The operator then starts the rotation of the chuck 4 and movement of the carriage 2 to the right, as viewed in Fig. 1, and when the workpiece is located about the grinding wheel 11 the hydraulic mechanism moves the piston 43 so that the carriage 9 is shifted to move the grinding wheel into engagement with the workpiece to effect the rough grinding, and the carriage 9 moves back to its starting position as the piston 43 returns to its rest position while the carriage 2 moves to the left, as viewed in Fig. 1, so that the workpiece moves away from the grinding wheel. When the carriage 2 moves beyond the position shown in Fig. 1 to the left, the block 23 will actuate the above-described ratchet mechanism for automatically turning the screw member 14 so that the carriage 9 is automatically shifted in this way. The carriage 9 is thus shifted automatically through a distance which will locate the outer surface of the grinding wheel in a position to be trued by the diamond when the latter subsequently moves along the grinding wheel. After thus moving to the left the hydraulic mechanism automatically moves the carriage 2 to the right, and the hydraulic mechanism also shifts the diamond 70 to the trueing position. When the carriage 2 has shifted to the right, as viewed in Fig. 1, far enough to locate the diamond opposite the grinding wheel 11, the automatic mechanism actuated by block 23 has previously shifted the grinding wheel into the path of the diamond to be trued thereby, the diamond moving together with the carriage 2 along the axis of the grinding wheel. It will be noted, however, that because of the automatic turning of screw 14 and shifting of carriage 9 thereby the carriage 9 will be no more in the position it had at the start of the operations when the rough grinding step took place. The axis of the grinding wheel will be located nearer to the surface being machined. Because the grinding wheel is trued by the diamond when the piston is at the end of its working stroke shown in Fig. 2, in the succeeding stroke of the piston the surface of the grinding wheel cannot move beyond the line determined by the diamond, and therefore the diamond accurately determines the diameter of the finished bore. After the trueing when the carriage 2 has moved to the left, as viewed in Fig. 1, approximately to the position shown in Fig. 1, the hydraulic mechanism automatically causes the diamond to be raised to its inoperative position and the carriage 2 again moves to the right, the carriage 9 having been retracted by the return movement of the piston 43 so that the workpiece becomes located about the grinding wheel. The hydraulic mechanism then moves the piston 43 in its second and final stroke and the finish grinding takes place, after which the finished workpiece is removed and the above operations are repeated.

As was pointed out above the first few test pieces may be machined by manual operation of the mechanical moving means described above, and it will be noted that even during operation of the hydraulic moving means corrections can be made at any time either with the hand wheel 20 or with the hand wheel 61.

In a practical embodiment of the invention the maximum stroke given by the hydraulic moving means to the carriage 9 is 0.36 mm., and by adjustment of the slide 55 this maximum stroke can be reduced to one-third, that is, 0.12 mm. The screw 55 has a pitch of 2 mm. and the worm 58 and worm wheel 57 have a 1 to 1 ratio. The eccentric intermediate portion 50 of the pivot pin provides with the screw 56 a shifting of carriage 9 of 0.006 mm. for one revolution of the hand wheel 61. Thus, it is possible with a fraction of the revolution of the hand wheel 61 to provide at any time an extremely fine adjustment of the carriage 9 on the order of 0.001 mm. and less.

It will be understood that each of the elements described above, or two or more together, may also find a useful application in other types of machine tools differing from the types described above.

While the invention has been illustrated and described as embodied in grinding machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine tool comprising, in combination, a carriage; support means supporting said carriage for movement along a predetermined path; a pivot pin having a first portion mounted for turning movement about its axis on said support means and a second portion rigid with said first portion and having an axis parallel to and spaced from said axis of said first portion; a lever turnably mounted intermediate its ends on said second portion of said pin for free turning movement thereon and operatively connected to said carriage for transmitting movement thereto; first moving means operatively connected to said lever for turning the same about said second portion of said pin; a second lever fixed to said second portion of said pin; and second moving means operatively connected to said second lever for turning the same and said pin therewith about the axis of said first portion of said pin.

2. A machine tool comprising, in combination, a carriage; support means supporting said carriage for movement along a predetermined path; a pivot pin having a first portion mounted for turning movement about its axis on said support means and a second portion rigid with said first portion and having an axis parallel to and spaced from said axis of said first portion; a lever turnably mounted intermediate its ends on said second portion of said pin for free turning movement thereon and operatively connected to said carriage for transmitting movement thereto; first moving means operatively connected to said lever for turning the same about said second portion of said pin; a second lever fixed to said second portion of said pin; a link connected to said second lever; a third lever turnably carried by said support means; second moving means connected to said third lever for moving the same on said support means; and means connecting said link to said third lever for movement therealong so that the movement transmitted through said link from said third lever to said second lever may be adjusted.

3. A machine tool comprising, in combination, a carriage; support means supporting said carriage for movement along a predetermined path; a pivot pin having a first portion mounted for turning movement about its axis on said support means and a second portion rigid with said first portion and having an axis parallel to and spaced from said axis of said first portion; a lever turnably mounted intermediate its ends on said second portion of said pin for free turning movement thereon and operatively connected to said carriage for transmitting movement thereto; first moving means operatively connected to said lever for turning the same about said second portion of said pin; a second lever fixed to said second portion of said pin; a link connected to said second lever; a third lever turnably carried by said support means; second moving means connected to said third lever for moving the same on said support means; a block carried by said third lever for slidable movement thereon, said block being connected to said link; a screw member threadedly engaging said block for moving the same along said third lever upon turning of said screw member; and manually operable means extending to the exterior of the machine tool and operatively connected to said screw member for turning the same.

4. A machine tool comprising, in combination, support means; a carriage mounted on said support means for movement thereon; a pivot pin turnably carried by said support means at a first portion of said pivot pin and having a second portion forming an extension of said first portion and having an axis parallel to and spaced from the axis of said first portion; a first lever freely turnable on said second portion of said pivot pin and connected to said carriage for transmitting movement thereto; a second lever fixed to said second portion of said pivot pin; means connected to said second lever for turning the same and said pivot pin therewith; and means restraining a part of said first lever distant from said carriage against translational movement during turning of said second lever so that turning of the latter and said pivot pin shifts said carriage through said first lever.

5. A machine tool comprising, in combination, support means; a carriage mounted on said support means for movement thereon; a pivot pin turnably carried by said support means at a first portion of said pivot pin and having a second portion forming an extension of said first portion and having an axis parallel to and spaced from the axis of said first portion; a first lever freely turnable on said second portion of said pivot pin and connected to said carriage for transmitting movement thereto; means engaging a portion of said first lever distant from said carriage for restraining said portion of said first lever against translational movement; a second lever fixed to said second portion of said pivot pin; a link connected to and extending from said second lever; a block connected to said link; a third lever turnably carried by said support means and slidably carrying said block; moving means connected to said third lever for moving the same; and adjusting means connected to said block for adjusting the position thereof along said third lever.

6. A machine tool comprising, in combination, support means; a carriage mounted on said support means for movement thereon; a pivot pin turnably carried by said support means at a first portion of said pivot pin and having a second portion forming an extension of said first portion and having an axis parallel to and spaced from the axis of said first portion; a first lever freely turnable on said second portion of said pivot pin and connected to said carriage for transmitting movement thereto; means engaging a portion of said first lever distant from said carriage for restraining said portion of said first lever against translational movement; a second lever fixed to said second portion of said pivot pin; a link connected to and extending from said second lever; a block connected to said link; a third lever turnably carried by said support means and slidably carrying said block; moving means connected to said third lever for moving the same; a screw threadedly engaging said block for shifting the same along said third lever; worm means connected to said screw for turning the same; and manually operable means extending to the exterior of the machine tool and operatively connected to said worm means for operating the same.

7. A machine tool comprising, in combination, support means; a carriage mounted on said support means for movement therealong; a first link connected to said carriage; a first lever connected to said first link; a pivot pin having an intermediate portion turnably supporting said first lever intermediate the ends thereof and having an end portion eccentric to said intermediate portion and turnably carried by said support means; screw means operatively connected to said first lever for turning the same; manually operable means connected to said screw means for turning the same; automatic operating means connected to said screw means for operating the same; a second lever fixed to said intermediate portion of said pivot pin; a second link connected to said second lever; a third lever turnably carried by said support means; means connecting said second link to said third lever for adjustable movement therealong; and hydraulic means operatively connected to said third lever for turning the same.

8. A machine tool comprising, in combination, a carriage; support means supporting said carriage for movement along a predetermined path; a pivot pin having a first portion mounted for turning movement about its axis on said support means and a second portion rigid with said first portion and having an axis parallel to and spaced from said axis of said first portion; a lever turnably mounted intermediate its ends on said second portion of said pin for free turning movement thereon and operatively connected at one end to said carriage for transmitting movement thereto; mechanical moving means connected to the other end of said first lever for turning the same and thereby move said carriage along said path; a second lever fixed to said second portion of said pin; a link connected to said second lever; a third lever turnably carried by said support means; hydraulic moving means located adjacent said mechanical moving means and operatively connected to said third lever for turning said third lever and thereby move said carriage also along said path; and means for automatically actuating said mechanical moving means to move said carriage independently of the operation of said hydraulic moving means at predetermined times during the operation of said hydraulic moving means.

References Cited in the file of this patent

UNITED STATES PATENTS

| | | |
|---|---|---|
| 1,006,550 | Heald | Oct. 24, 1911 |
| 1,993,830 | Conover | Mar. 12, 1935 |
| 2,101,383 | Asbridge | Dec. 7, 1937 |
| 2,127,856 | Blood | Aug. 23, 1938 |
| 2,339,140 | Boillat | Jan. 11, 1944 |
| 2,531,340 | Mathys | Nov. 21, 1950 |

FOREIGN PATENTS

| | | |
|---|---|---|
| 552,220 | Germany | June 11, 1932 |
| 727,863 | Germany | Nov. 13, 1942 |